United States Patent
Xia

(10) Patent No.: US 9,792,374 B2
(45) Date of Patent: Oct. 17, 2017

(54) METHOD AND SYSTEM FOR FACILITATING TERMINAL IDENTIFIERS

(71) Applicant: Alibaba Group Holding Limited, George Town, Grand Cayman (KY)

(72) Inventor: Jupeng Xia, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 11 days.

(21) Appl. No.: 14/743,850

(22) Filed: Jun. 18, 2015

(65) Prior Publication Data

US 2016/0036796 A1 Feb. 4, 2016

(30) Foreign Application Priority Data

Aug. 4, 2014 (CN) .......................... 2014 1 0380181

(51) Int. Cl.
  *G06F 7/04* (2006.01)
  *G06F 17/30* (2006.01)
  *H04L 29/06* (2006.01)

(52) U.S. Cl.
  CPC ........ *G06F 17/30867* (2013.01); *H04L 63/20* (2013.01); *H04L 63/06* (2013.01)

(58) Field of Classification Search
  CPC ................................ H04L 63/20; H04L 63/06
  USPC ......................................................... 726/17
  See application file for complete search history.

(56) References Cited

U.S. PATENT DOCUMENTS

| | | | |
|---|---|---|---|
| 6,173,400 B1 * | 1/2001 | Perlman ................. | G06F 21/34 380/255 |
| 7,603,369 B2 * | 10/2009 | Koganei ................. | G06F 21/31 |
| 7,711,113 B2 * | 5/2010 | Takahashi ............. | H04L 9/3247 380/30 |
| 8,117,450 B2 * | 2/2012 | Krawetz ............... | H04L 9/3236 380/28 |
| 8,619,983 B2 * | 12/2013 | Tao ........................ | H04N 7/163 380/211 |
| 8,621,203 B2 * | 12/2013 | Ekberg ................... | H04L 9/321 713/156 |
| 2006/0156012 A1 | 7/2006 | Beeson | |
| 2006/0210078 A1 | 9/2006 | Sakamura et al. | |
| 2008/0207169 A1 * | 8/2008 | Park ....................... | G06F 21/73 455/411 |
| 2008/0212771 A1 * | 9/2008 | Hauser ................... | G06F 21/305 380/44 |
| 2009/0112968 A1 | 4/2009 | Matsune et al. | |
| 2010/0229224 A1 | 9/2010 | Etchegoyen | |
| 2010/0266125 A1 | 10/2010 | Tanaka et al. | |
| 2010/0325441 A1 * | 12/2010 | Laurie .................... | G06F 21/31 713/185 |
| 2011/0185402 A1 | 7/2011 | Wang et al. | |
| 2012/0102558 A1 | 4/2012 | Muraki | |

(Continued)

*Primary Examiner* — Teshome Hailu
(74) *Attorney, Agent, or Firm* — Shun Yao; Park, Vaughan, Fleming & Dowler LLP

(57) ABSTRACT

Embodiments of the present application disclose a method for providing a terminal identifier to a terminal. During operation, a security server receives a registration information set from the terminal, in which the registration information set includes multiple pieces of equipment information from the terminal. The security server then generates a terminal identifier based on the multiple pieces of equipment information in the registration information set. The security server then returns the terminal identifier to the terminal.

14 Claims, 6 Drawing Sheets

(56) References Cited

U.S. PATENT DOCUMENTS

| | | | | |
|---|---|---|---|---|
| 2015/0039883 A1* | 2/2015 | Yoon | ............... | H04L 9/0847 |
| | | | | 713/155 |
| 2015/0200941 A1* | 7/2015 | Muppidi | ............ | H04L 41/28 |
| | | | | 726/1 |
| 2016/0072819 A1* | 3/2016 | Chen | ............... | H04L 63/0861 |
| | | | | 726/4 |
| 2016/0105410 A1* | 4/2016 | Zhou | ............... | H04W 12/06 |
| | | | | 726/9 |

\* cited by examiner

METHOD AND SYSTEM FOR FACILITATING TERMINAL IDENTIFIERS

RELATED APPLICATION

Under 35 U.S.C. 119, this application claims the benefit and right of priority of Chinese Patent Application No. 201410380181.5, filed 4 Aug. 2014.

BACKGROUND

Field

The present application relates to the field of computer technologies, and in particular, to a method and system for facilitating terminal identifiers to manage security among networked devices.

Related Art

A terminal identifier is a unique identifier assigned to a terminal device (e.g., a mobile phone or a computer) and used for distinguishing the terminal from other terminals. Proper equipment identification is important to network security.

Typically, when a user operates a terminal over a network, a security server may monitor and analyze user behavior such as service requests from the terminal. By analyzing the user behavior, the server can determine the strength of the association between the user and the terminal, and determine whether the user is likely to be authorized to use that terminal. The server may then take appropriate measures to manage the risk associated with the user operating the terminal. Therefore, it is important for the server to properly identify the terminal devices in the network.

Conventional approaches generally use information from a single piece of equipment of a terminal device as the identifier for the terminal. For example, one may use a media access control (MAC) address of a computer as the identifier of the computer, or an international mobile equipment identity (IMEI) of a mobile phone as the identifier for the mobile phone. However, using information from a single piece of equipment as the identifier for the terminal has a number of shortcomings. For example, access to equipment information of the terminal may be limited to those with access rights. When access to such information is limited, it may be difficult or impossible to determine the identifier for the terminal. As a result, a security server cannot identify user behavior associated with the terminal, and therefore cannot determine whether the user is an authorized user.

SUMMARY

One embodiment of the present invention provides a system for providing a terminal identifier to a terminal. During operation, a security server receives a registration information set from the terminal, in which the registration information set includes multiple pieces of equipment information from the terminal. The security server then generates a terminal identifier based on the multiple pieces of equipment information in the registration information set. The security server subsequently returns the terminal identifier to the terminal.

In a variation of this embodiment, generating the terminal identifier based on the multiple pieces of equipment information in the registration information set includes generating a character string based on the multiple pieces of equipment information in the registration information set. The secure server then generates a signature based on the character string and a key of the security server. The security server then generates the terminal identifier based on the character string and the signature. The security server may store data indicating a corresponding relationship between the terminal identifier and the registration information set.

In a further variation, returning the terminal identifier to the terminal includes receiving an authentication information set from the terminal. The security server then searches for a terminal identifier corresponding to a registration information set that matches the authentication information set from a plurality of mapping relationships between a respective terminal identifier and a respective registration information set. The security server then returns the terminal identifier to the terminal.

In a further variation, searching for the terminal identifier corresponding to the registration information set that matches the authentication information set includes searching for the terminal identifier corresponding to the registration information set for which a similarity to the authentication information set is greater than a predetermined threshold.

In a variation of this embodiment, the security server returns the terminal identifier to the terminal at a plurality of predetermined time slots.

In a variation of this embodiment, the security server receives an authentication information set from the terminal. The security server then updates the registration information set currently stored with the authentication information set. The security server then receives a new authentication information set. The security server searches for the terminal identifier corresponding to the updated registration information set that matches the new authentication information set. The security service subsequently returns the terminal identifier to the terminal.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Embodiments of the present invention solve the problem of providing a secure and accessible identifier for a terminal device on a network by generating a unique identifier for the terminal based on equipment information of the terminal. During operation, a security server can receive a set of registration information associated with one or more pieces of hardware or software equipment on the terminal, and then generate and assign a unique identifier to the terminal. The terminal can make this unique identifier available to other network devices for use in risk analysis, product recommendations, and other applications.

In some application scenarios, access to equipment information in a terminal may be limited. Other network devices (or other parties, network nodes, processes, objects, or other equipment) might not be able to access freely such equipment information, which is determined by the terminal's operating system or equipment manufacturer. Some conventional approaches may use the equipment information of a single equipment in the terminal as the identifier of the terminal. However, if the equipment information is not accessible, the terminal cannot be identified.

In embodiments of the present application, a security server may receive information associated with multiple pieces of equipment of a terminal. The security server may generate an identifier based on this information set, and return the identifier to the terminal. Since the terminal identifier does not depend on information of a single piece of equipment, the terminal identifier remains available even if one piece of equipment information on the terminal is inaccessible.

Figure 1:
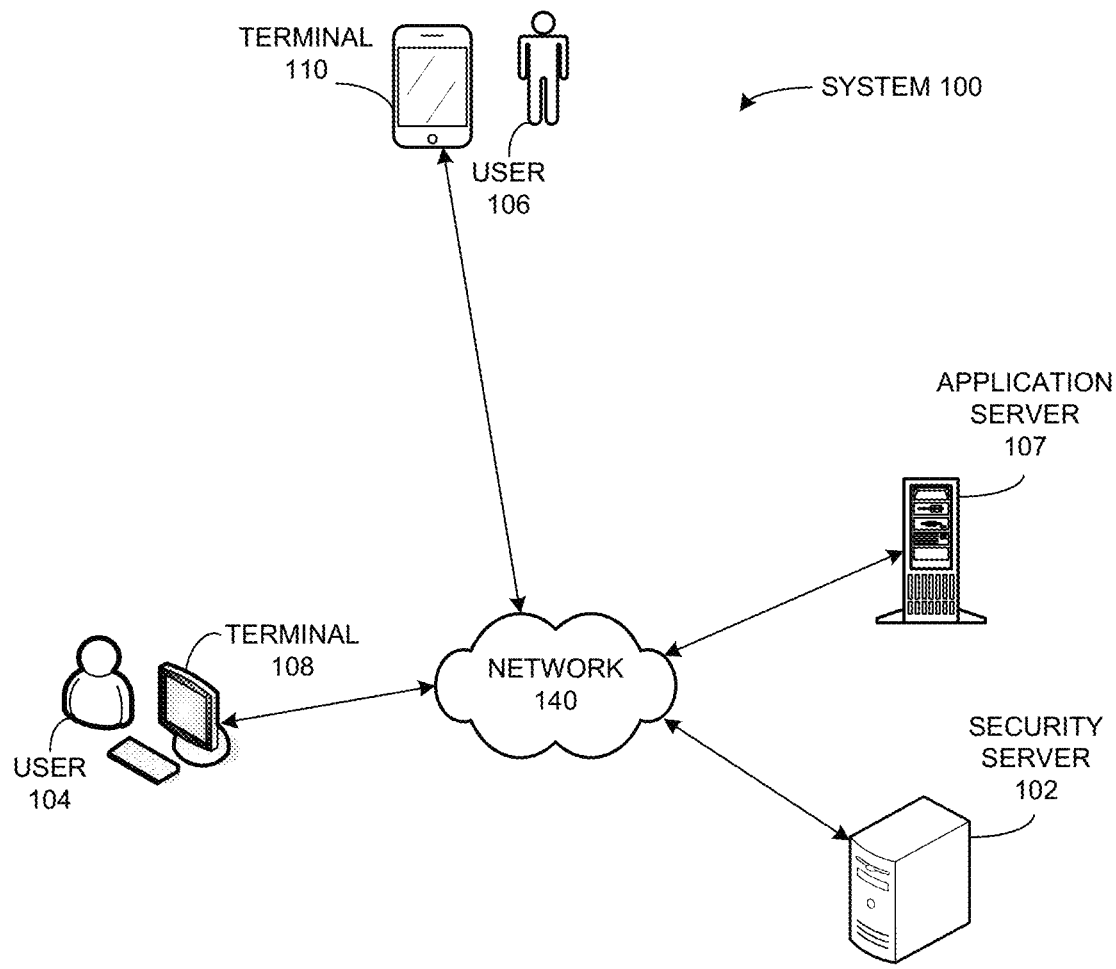
FIG. 1 illustrates an exemplary computing system that facilitates a terminal identifier generation process, in accordance with an embodiment of the present application.

FIG. 1 illustrates an exemplary computing system 100 that facilitates a terminal identifier generation process, in accordance with an embodiment of the present application. In this example, a security server 102 is in communication with user 104 and user 106 over a network 140. User 104 is operating terminal 108, and user 106 is operating terminal 110. Security server 102 is optionally coupled to an application server 107. Terminal 108 may send a login request to application server 107 when logging onto an application webpage, and send a registration information set to security server 102. The registration information set includes multiple pieces of equipment information of terminal 108, such as video card equipment information and/or sound card equipment information. In response, security server 102 generates a terminal identifier based on the registration information set, and returns the terminal identifier to terminal 108. Terminal 108 may then make its terminal identifier available to other network devices.

Figure 2:
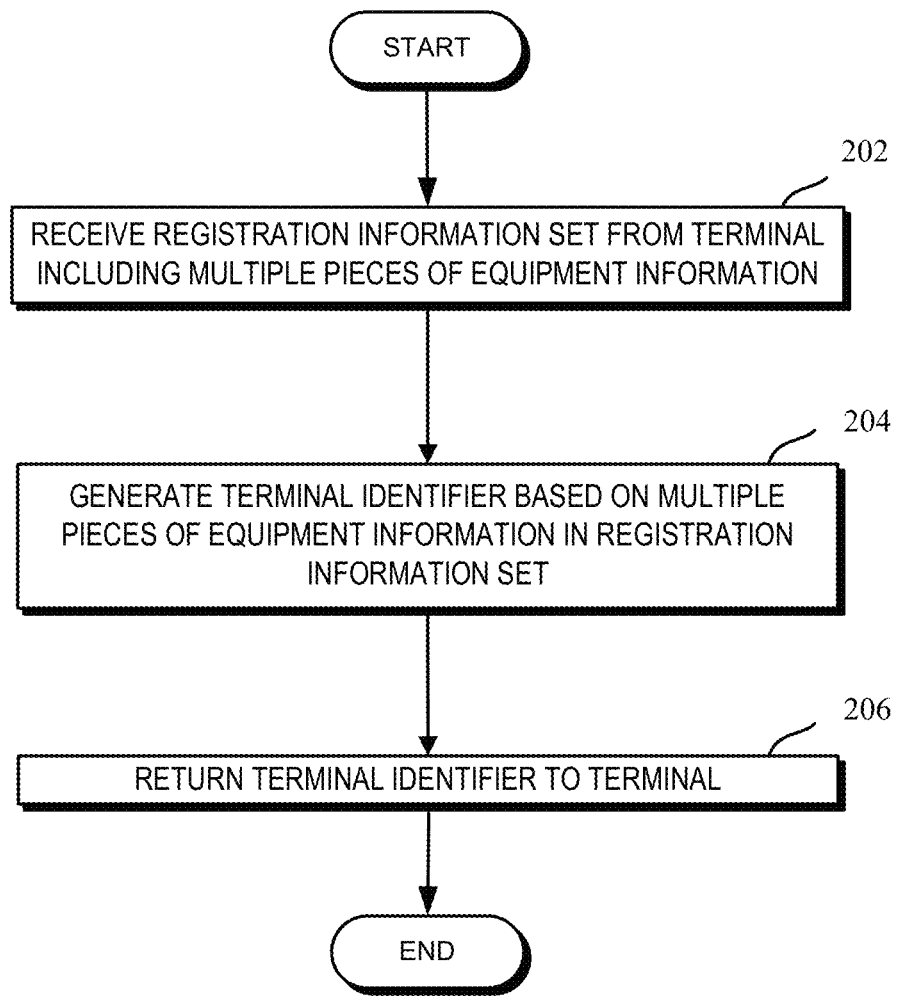
FIG. 2 illustrates a process for providing a terminal identifier, in accordance with an embodiment of the present application.

FIG. 2 illustrates a process for providing a terminal identifier, in accordance with an embodiment of the present application. During operation, a security server receives a registration information set from a terminal (operation 202). The registration information set includes multiple pieces of equipment information of the terminal.

In an embodiment of the present application, the equipment information in the registration information set is from current hardware or software of the terminal, and the terminal can be uniquely identified by the registration information set which includes the multiple pieces of equipment information of the terminal. Specifically, the equipment information may be from one or more, or any combination of, a plurality of components and devices with equipment information that are not restricted by access right limitations. The equipment may include internal, external, hardware, and software components in the terminal. Examples of equipment information include information associated with a central processing unit (CPU), a video card, a sound card, a network interface card, a memory, a storage device, a power supply, a fan, etc.

The disclosure below uses an example registration information set that includes the information of the CPU, video card, sound card, network interface card, and memory in the terminal. This example registration information set is denoted as $I_1=\{$equipment information of a CPU, video card, sound card, network interface card, and memory$\}$.

In some embodiments, a terminal may spontaneously (e.g., on its own initiative without being requested by the security server) send the registration information set to the security server. For example, the terminal may detect that no terminal identifier has been assigned. The terminal may, on its own initiative (e.g., without a request from the security server), acquire equipment information corresponding to multiple components in the terminal, which constitutes the registration information set. The terminal may then send the registration information set to the security server. Alternatively, in the process of logging onto a certain application webpage, the terminal may send a login request to an application server (e.g., which may also be the security server). The terminal may actively send the registration information set to the security server when the terminal receives a response message returned by the application server.

The terminal may send the registration information set separately or combined with other information. After the security server receives data that includes the registration information set, the security server may acquire the registration information set directly if the received data only includes the registration information set, or the security server may acquire the registration information set by extracting the set information from combined data.

In an embodiment of the present application, the terminal may acquire each piece of equipment information directly from their original memory location to form the registration information set. However, the original memory locations of the equipment information corresponding to different components may be different, and the terminal's efficiency when acquiring the equipment information may be reduced.

Thus, preferably, the terminal may acquire each piece of equipment information from a software development kit (SDK) or a script library (e.g., a JavaScript library) running on the terminal to form the registration information set. The equipment information of each piece of equipment in the terminal is stored in the SDK or the script library, and the terminal may simultaneously acquire each piece of equipment information from the SDK or the script library, thereby improving the efficiency with which the terminal acquires the equipment information. In addition, the equipment information (e.g., equipment information of a CPU, video card, sound card, network interface card, memory, etc.) in the SDK or the script library is consistent with the actual equipment information of the corresponding equipment. That is, when the equipment information of certain equipment in the terminal changes, the corresponding equipment information in the SDK or the script library may be timely updated, so that the terminal can obtain accurate equipment information from the SDK or the script library.

Subsequently, the security server may generate the terminal identifier based on the multiple pieces of equipment information in the registration information set (operation 204).

After the security server receives the registration information set including multiple pieces of equipment information of the terminal in operation 202, the security server may generate the terminal identifier based on the multiple pieces of equipment information in the registration information set.

The security server subsequently returns the terminal identifier to the terminal (operation 206).

Figure 3:
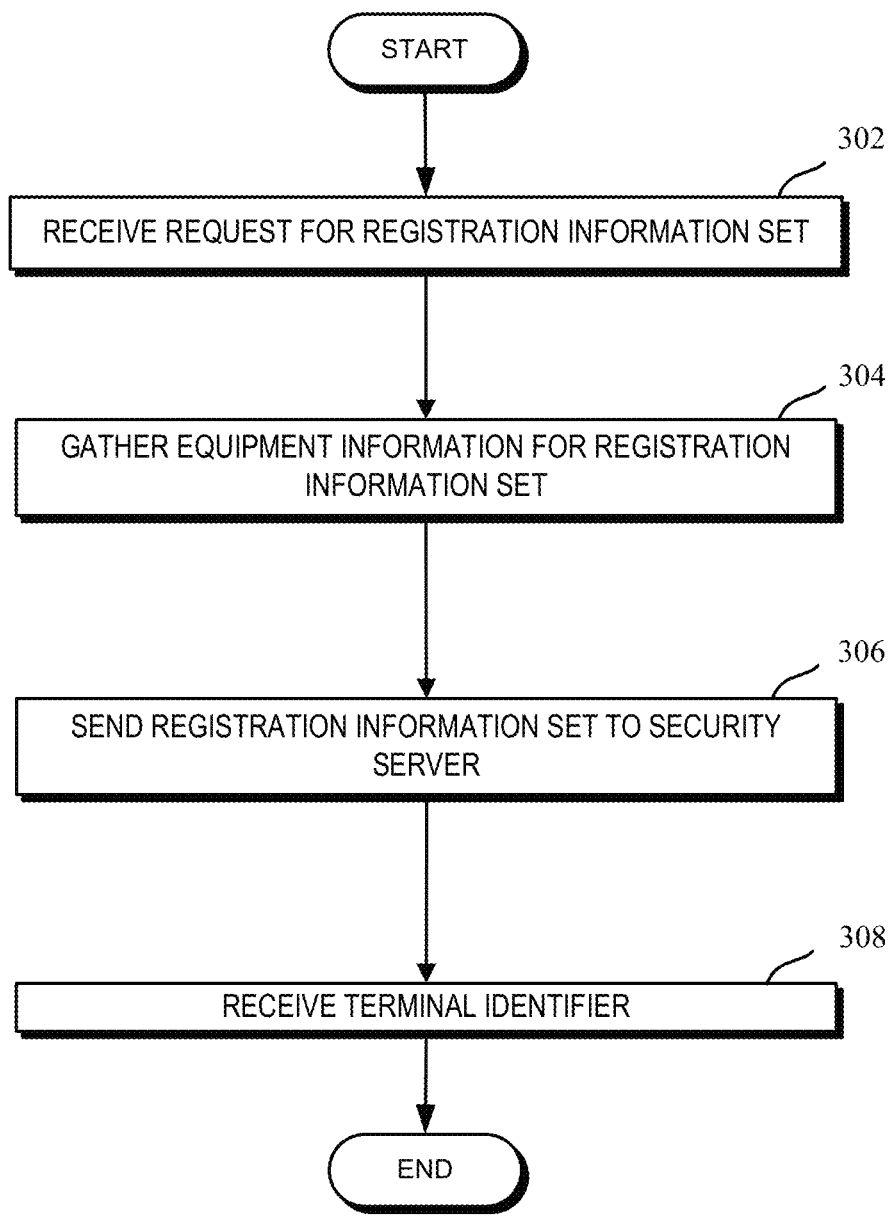
FIG. 3 illustrates a process for acquiring a terminal identifier, in accordance with an embodiment of the present application.

FIG. 3 illustrates a process for acquiring a terminal identifier, in accordance with an embodiment of the present application. During operation, a terminal receives a request for a registration information set (operation 302). The terminal may receive a request from a security server. The terminal may also determine that it does not have a terminal identifier and spontaneously submit a registration information set and a request for a terminal identifier to the security server, without receiving a request for a registration information set.

The terminal may gather the equipment information for the registration information set from the different components that make up the terminal (operation 304). For example, the terminal may gather get the equipment information from hardware and/or software. The terminal may then send the registration information set to the security server (operation 306). The terminal subsequently receives a terminal identifier (operation 308). The terminal may make the terminal identifier available to other network devices that request it.

In embodiments of the present application, the security server may generate the terminal identifier using one or more of the following methods discussed below with respect to different implementations.

Implementation I involves generating a terminal identifier from one or more character strings of equipment information. Implementation II involves generating a hash from the character string to use as terminal identifier. Implementation III involves generating a hash plus signature to use as terminal identifier. Implementation IV involves receiving an authentication information set from the terminal to authenticate the terminal before sending the terminal identifier.

Implementation I—Character String

The security server may receive in a registration information set one or more character strings corresponding to a CPU, a video card, a sound card, a network interface card, and memory of the terminal. The security server may then combine all or part of the character strings of the equipment information into a first character string.

The security server may use the first character string as the terminal identifier. The security server (and/or the terminal) may establish a mapping relationship between the registration information set and the terminal identifier, and store data indicating this mapping relationship. The security server (and/or the terminal) may make the terminal identifier and corresponding registration information set available for subsequent inquiries.

In a practical application scenario, there may be different terminals with similar equipment. Consequently, the terminal identifier generated by the security server for multiple terminals may be not unique, i.e., two or more terminals may have the same terminal identifier. To ensure the uniqueness of each terminal identifier generated two variations of implementation I can be used, as described below.

In one variation of implementation I, the security server may generate a first character string based on the method described above, and then may generate a second character string by adding a timestamp to the first character string. The security server may use the second character string as the terminal identifier, thereby ensuring the uniqueness of the terminal identifier.

In another variation of implementation I, the security server may combine a random number and the character string generated based on each piece of equipment information to produce a unique terminal identifier.

Implementation II—Hash

In this embodiment, the security server can generate a first character string based on the techniques of implementation I or any variation of implementation I. The security server then generates a second character string with a fixed length by hashing the first character string. The security server (and/or the terminal) uses the second character string as the terminal identifier, and establishes a mapping relationship between the registration information set and the terminal identifier. The security server (and/or the terminal) stores data indicating such a mapping relationship, and makes the registration information set and corresponding terminal identifier available for subsequent inquiries. The second character string obtained through the hash computation effectively ensures that the terminal identifier is not tampered with during the network transmission process (e.g., transmission from the security server to the terminal). The integrity of the second character string is thereby assured.

Implementation III—Hash Plus Signature

In this embodiment, the security server generates a second character string as terminal identifier based on the above operations discussed with respect to implementation II, and generates a signature based on the second character string and a key of the security server. The security server then generates a third character string based on the second character string and the signature. This third character string may be used as the terminal identifier, and the security server may establish a mapping relationship between the registration information set and the terminal identifier.

For example, the security server may use the second character string and the key as input values of a hash-based message authentication code (HMAC), and use the output value of the HMAC algorithm as a signature. The security server embeds the signature into the second character string to obtain a third character string (the third character string is equivalent to a signed second character string), and the security server uses the third character string as the terminal identifier.

The security server, terminal, application server, and/or other network devices may use the signature of the terminal identifier to ensure the integrity of the terminal identifier (e.g., the terminal identifier has not been tampered with during the network transmission process). The devices may also use the signature to verify the authenticity of the terminal identifier (e.g., the terminal identifier has not been counterfeited by a third party). When the terminal receives the terminal identifier generated by the security server, because the terminal identifier carries a signature, the terminal may verify the authenticity and/or integrity of the terminal identifier. If the terminal can successfully verify the terminal identifier, the terminal stores and uses the terminal identifier. Likewise, after the application server acquires the terminal's signed terminal identifier, the application server may verify the authenticity and/or integrity of the terminal identifier, and subsequently provide service based upon successful verification of the terminal identifier.

If the security server is generating a terminal identifier for only one terminal, then the security server returns the terminal identifier to that terminal. However, in some scenarios, the security server may need to simultaneously generate corresponding terminal identifiers for multiple terminals. If the security server cannot determine which terminal of the multiple terminals corresponds to a registration information set $I_1$, the security server may not be able to return the terminal identifier generated based on the registration information set $I_1$ to the proper terminal. Thus, the application below describes implementation IV for solving this collision problem. Implementation IV includes a process for generating terminal identifiers for multiple terminals and providing a proper identifier to a respective terminal.
Implementation IV—Authentication Information Set After the security server generates the terminal identifier in operation 204, the security server may receive an authentication information set from the terminal. Similar to the registration information set, the authentication information set includes multiple pieces of equipment information. The equipment corresponding to each piece of equipment information in the authentication information set is the same as the equipment corresponding to each piece of equipment information in the registration information set. This effectively ensures that the registration information set and the authentication information set correspond to the same terminal.

The security server uses the authentication information set to determine the correct terminal identifier to return to the terminal. The security server may search for a terminal identifier corresponding to a registration information set that matches the authentication information set. The security server may search through mapping relationships between terminal identifiers and registration information sets. After successfully identifying a terminal identifier with a matching registration information set, the security server may then return the proper terminal identifier to the terminal.

For example, the security server may receive from the terminal the registration information set $I_1$={equipment information of a CPU, video card, sound card, network interface card, and memory}. The security server may receive from the terminal the authentication information set $I_1'$={equipment information of a CPU, video card, sound card, network interface card, and memory}. In this example, the registration information set is identical to the authentication information set (e.g., $I_1=I_1'$). That is, the $m^{th}$ piece of equipment information in the authentication information set and the $m^{th}$ piece of equipment information in the registration information set are equipment information of the same equipment in the terminal, where m is a positive integer. Note that the process for acquiring an authentication information set is similar to the process for acquiring a registration information set.

After the security server receives the authentication information set of the terminal, the security server may search terminal identifiers and registration information sets for a registration information set that matches the authentication information set.

As an example, after the security server receives the authentication information set $I_1'$ from the terminal, the security server searches for a registration information set $I_1$ that is identical to $I_1'$ from stored registration information sets. The security server also searches for a terminal identifier corresponding to the registration information set $I_1$, and returns to the terminal the terminal identifier that corresponds to the registration information set $I_1$.

However, after the security server generates the terminal identifier based on an earlier received registration information set $I_1$ of the terminal, but before the security server can return the terminal identifier to the terminal, equipment information in the terminal may change. If at least one piece of equipment information in the terminal changes, the authentication information set $I_1'$ subsequently received by the security server from the terminal is no longer identical to the earlier received registration information set $I_1$. For example, the terminal may change equipment information for one or more of a central processing unit, a video card, a sound card, a network card, or a memory. The security server then cannot find a registration information set that matches the updated authentication information set $I_1'$. In one embodiment, the security server may search for a terminal identifier corresponding to a registration information set that has a similarity with the updated authentication information set exceeding a predetermined threshold.

Figure 4:
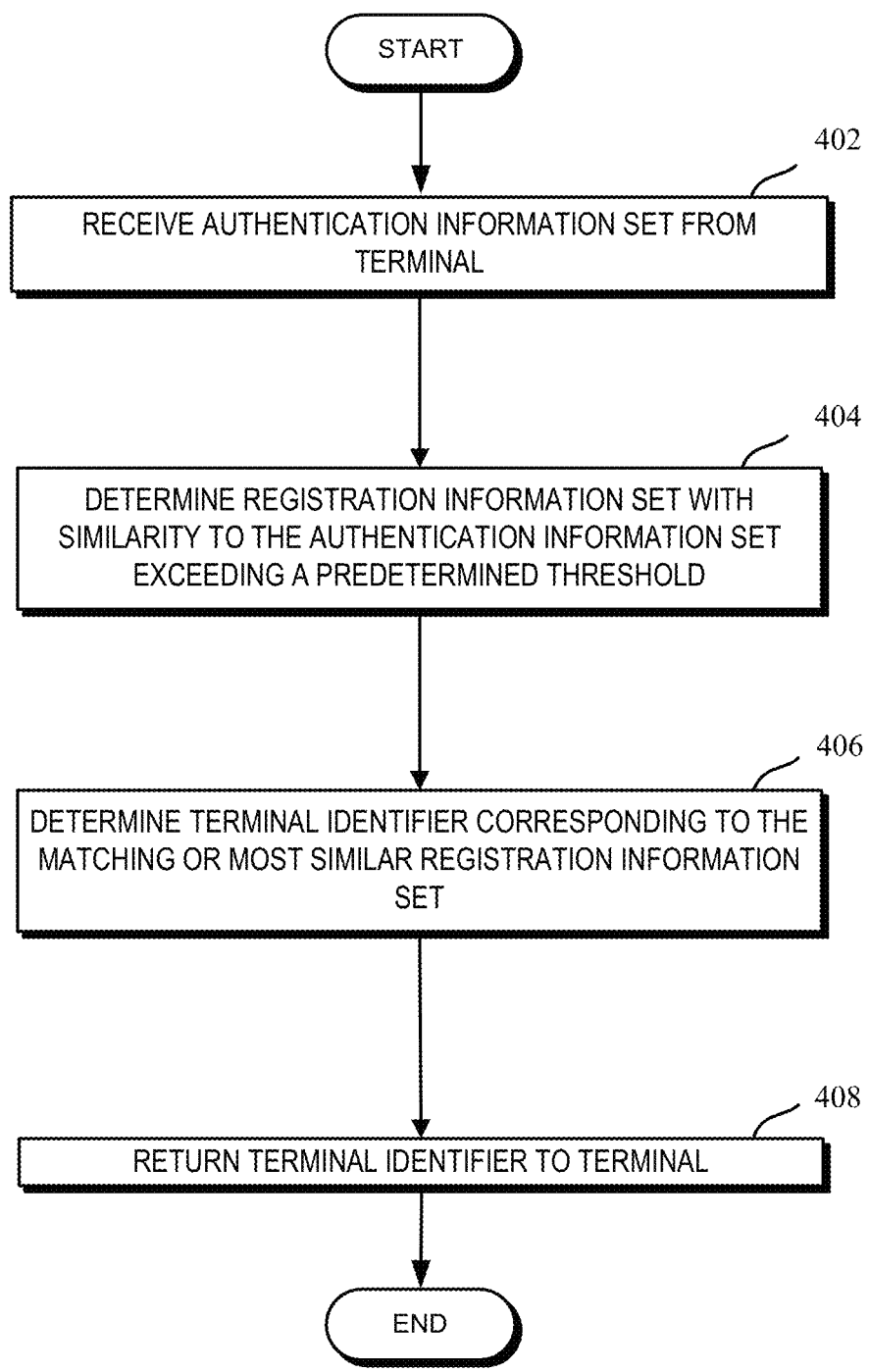
FIG. 4 illustrates a process for determining a terminal identifier of a terminal when equipment information of the terminal changes, in accordance with an embodiment of the present application.

FIG. 4 illustrates a process for determining a terminal identifier of a terminal when equipment information of the terminal changes, in accordance with an embodiment of the present application. During operation, the security server receives an authentication information set $I_1'$ from the terminal (operation 402). Next, the security server determines a registration information set with similarity to the authentication information set exceeding a predetermined threshold (operation 404). The security server may compare the authentication information set $I_1'$ received from the terminal with each stored registration information set. The security server may further determine a degree of similarity between the authentication information set $I_1'$ and each stored registration information set. The security server then determines the registration information set $I_1$ for which the similarity with the authentication information set $I_1'$ is greater than the predetermined threshold.

Next, the security server determines a terminal identifier that corresponds to the matching or most similar registration information set $I_1$ (operation 406), and subsequently returns the identified terminal identifier to the terminal (operation 408). The security server may properly return the stored terminal identifier to the corresponding terminal based on an authentication information set that is not identical to the stored registration information set but comes from the same terminal as the registration information set. The terminal may have changed some equipment information but the security server can still return the correct terminal identifier to the terminal.

In some situations, a malicious party may tamper with the terminal identifier after the security server generates and returns the terminal identifier to the terminal. Therefore, to ensure the integrity of the terminal identifier, the security server may send the terminal identifier to the terminal at predetermined time slots. The terminal may then reset the terminal identifier stored therein by adopting the terminal identifier received from the security server at each time slot. Note that the predetermined time slots may vary according to different implementations. For example, the security server may apply random time intervals between time slots or periodic intervals between time slots.

Specifically, the security server may acquire the authentication information set from the terminal at each predetermined time slot, search for the terminal identifier corresponding to the registration information set that matches the authentication information set, and return the identified terminal identifier to the terminal.

As time goes by, a user may change or upgrade one or more pieces of equipment in the terminal. Once the authentication information set of the terminal cannot be matched with the registration information set stored on the security server (either exact match or similarity-based match) due to changes in the equipment information, the security server can no longer provide the proper terminal identifier to the terminal. A solution for this problem is described below.

In one embodiment, each time the security server receives an authentication information set from the terminal and then searches for the registration information set that matches (e.g. similarity is within a predetermined threshold) and/or is most similar to the authentication information set, the security server may update the current stored registration information set.

Figure 5:
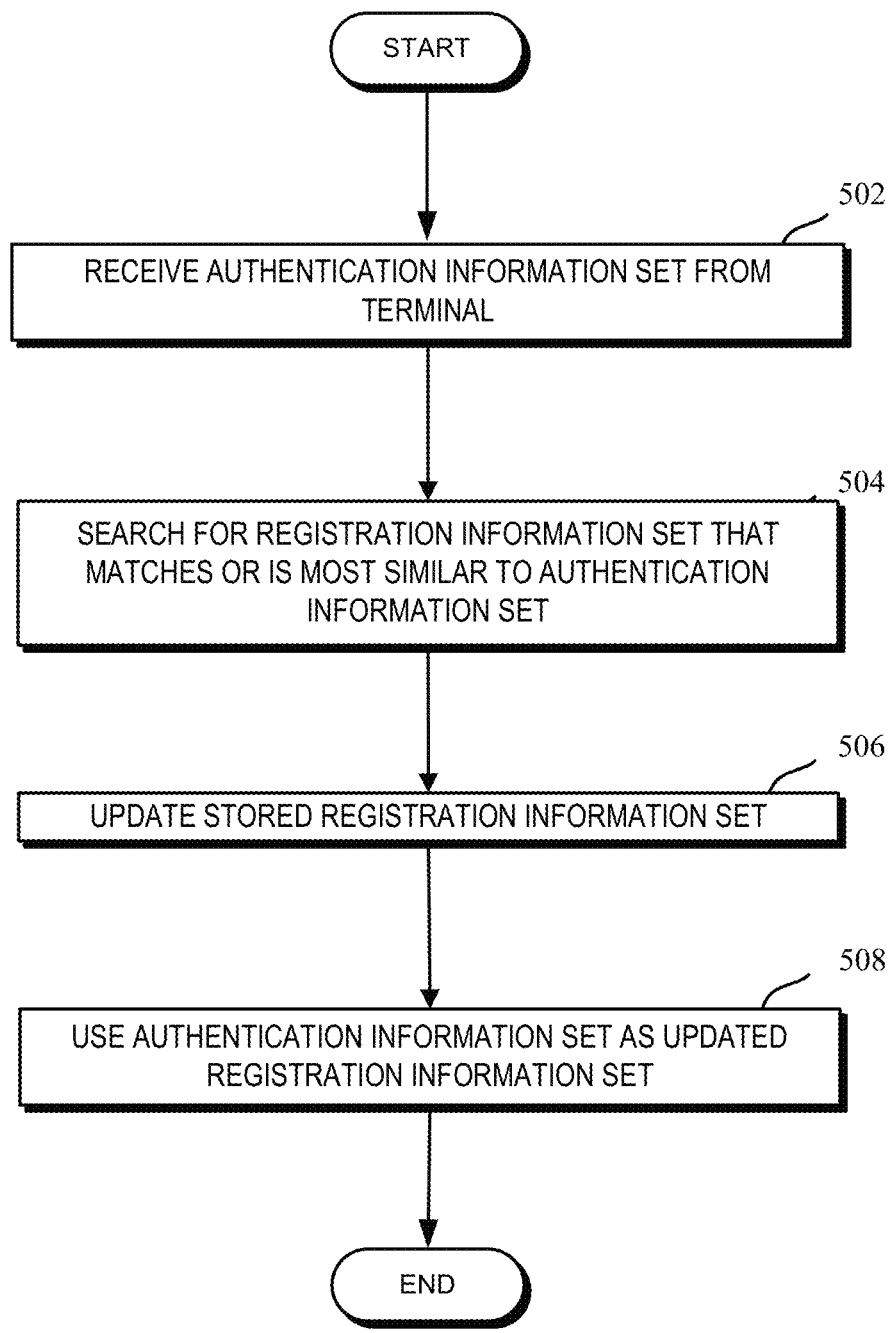
FIG. 5 illustrates a process for updating a registration information set, in accordance with an embodiment of the present application.

FIG. 5 illustrates a process for updating a registration information set, in accordance with an embodiment of the present application. During operation, the security server receives an authentication information set from the terminal (operation 502). Next, the security server searches for the registration information set that matches (e.g. similarity is within a predetermined threshold) and/or is most similar to the authentication information set (operation 504). Subsequently, the security server may update the current stored registration information set (operation 506). The security server may substitute the current stored registration information set with the current received authentication information set. The security server may also store multiple versions of the registration information set. The security server may then use the authentication information set as the current updated registration information set (operation 508).

The security server may store multiple versions of the registration information set corresponding to the terminal identifier. The security server may store the original registration information set as a first registration information set, and use the current received authentication information set as a second registration information set corresponding to the same terminal identifier. Under such a scenario, the same terminal identifier may correspond to multiple registration information sets, but one registration information set only corresponds to one terminal identifier.

Thus, when the security server updates the registration information set and then receives the authentication information set of the terminal again at a predetermined time slot, the security server may search for the terminal identifier corresponding to the most recent registration information set that matches the authentication information set. Because the registration information set has been updated (e.g., either by storing multiple versions or by replacing an old registration information set), the current received authentication information set is expected to be identical to the updated registration information set, and the security server may provide the proper terminal identifier to the terminal.

While users typically change equipment such as a video card or a memory in a terminal, they do not change a large amount of equipment within a short time. The security server may substitute a registration information set with a corresponding authentication information set received at a certain time. When a user subsequently changes the equipment in the terminal, there are only minor differences between the authentication information set of the terminal with the equipment change and the registration information set stored in the security server. Thus, the security server may still send the proper terminal identifier to the terminal, even if some equipment in the terminal has changed.

The security server may continually take the authentication information set as a new registration information set and establish a mapping relationship between the new registration information set and the terminal identifier (e.g., one terminal identifier corresponds to multiple registration information sets). Because one registration information set may only correspond to one terminal identifier, even if the equipment in the terminal changes, the security server may still find a unique matching registration information set based on the authentication information set received from the terminal with the equipment changes. The security server may return the terminal identifier corresponding to the matching registration information set to the terminal.

Figure 6:
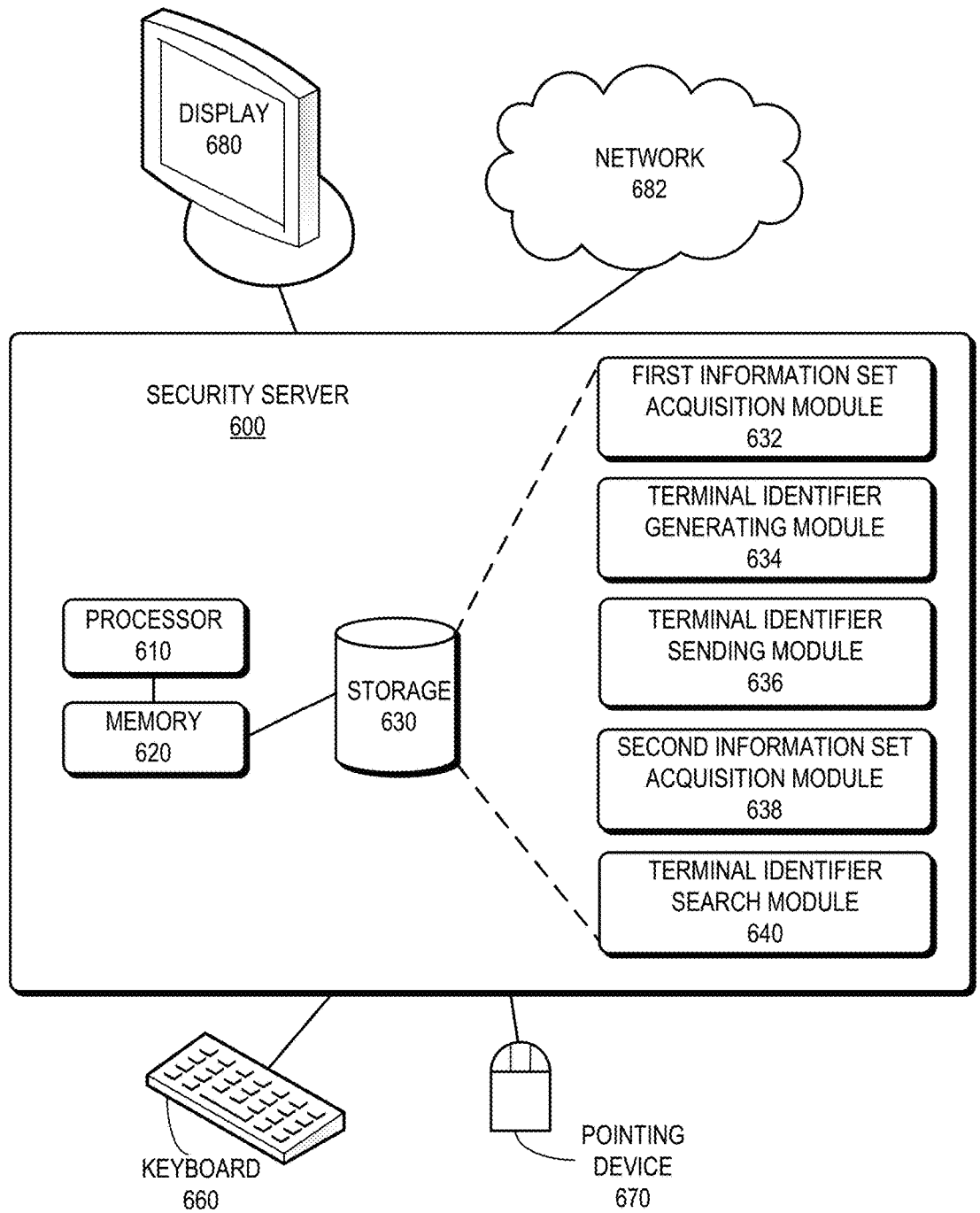
FIG. 6 illustrates an exemplary device for providing a terminal identifier, in accordance with an embodiment of the present application.

FIG. 6 illustrates an exemplary security server for providing a terminal identifier, in accordance with an embodiment of the present invention. A security server 600 includes a processor 610, a memory 620, and a storage device 630. Storage 630 typically stores instructions that can be loaded into memory 620 and executed by processor 610 to perform the methods described above. In one embodiment, the instructions in storage 630 can implement a first information set acquisition module 632, a terminal identifier generating module 634, a terminal identifier sending module 636, a second information set acquisition module 638, and a terminal identifier search module 640, which can communicate with each other through various means.

In some embodiments, modules 632, 634, 636, 638 and 640 can be partially or entirely implemented in hardware and can be part of processor 610. Further, in some embodiments, security server 600 may not include a separate processor and memory. Instead, in addition to performing their specific tasks, modules 632, 634, 636, 638 and 640, either separately or in concert, may be part of special-purpose computation engines.

Storage device 630 stores programs to be executed by processor 610. Specifically, storage 630 stores a program that implements a system (e.g., application) for providing a terminal identifier. During operation, the application program can be loaded from storage 630 into memory 620 and executed by processor 610. As a result, security server 600 can perform the functions described above. Security server 600 further optionally includes a display 680, and can be coupled to a keyboard 660 and a pointing device 670, and can be coupled via one or more network interfaces to a network 682.

During operation, first information set acquisition module 632 receives a registration information set from a terminal. The registration information set includes multiple pieces of equipment information of the terminal.

Terminal identifier generating module 634 then generates a terminal identifier based on the multiple pieces of equipment information in the registration information set. Terminal identifier generating module 634 may generate a character string based on the equipment information and a signature based on the character string and a key of security server 600. Terminal identifier generating module 634 may generate the terminal identifier based on the character string and the signature, and establish a mapping relationship between the terminal identifier and the registration information set. Terminal identifier generating module 634 may store data indicating the mapping relationship between the terminal identifier and the registration information set. Terminal identifier sending module 636 then returns the terminal identifier to the terminal.

Security server 600 may further include an extension module coupled to the terminal identifier generating module 634. The extension module may be positioned in equipment external to security server 600 and coupled to security server 600. When terminal identifier generating module 634 needs an extended function, such as another function for generating the terminal identifier, security server 600 loads the extension module. In this way, when the terminal identifier generating module 634 needs to add other extended functions, the function of the extension module may be added without modifying the function of the terminal identifier generating module 634. For example, security server 600 may load an extension module that includes additional hash functions. Moreover, the extension module and the terminal identifier generating module 634 may interface with each other, and security server 600 may call the interface of the extension module to load the extension module.

Security server 600 may further include a second information set acquisition module 638 configured to receive an authentication information set from the terminal. Security server 600 may also include a terminal identifier search module 640 configured to search for a terminal identifier corresponding to a registration information set that matches the authentication information set. Security server 600 may search from a plurality of mapping relationships between a terminal identifier and a respective registration information set. The terminal identifier generating module 634 may establish these mapping relationships, and store data indicating these mapping relationships.

Terminal identifier sending module 636 returns to the terminal the terminal identifier identified by the terminal identifier search module 640. Furthermore, terminal identifier sending module 636 may be configured to return the terminal identifier at predetermined time slots.

Terminal identifier search module 640 may also be configured to search for a terminal identifier corresponding to a registration information set with similarity to the authentication information set greater than a predetermined threshold. To do so, terminal identifier search module 640 may search through a plurality of mapping relationships between each terminal identifier and a respective registration information set.

In conclusion, embodiments of the present application solve the problem of reliably identifying a terminal device when access to equipment information on the terminal is limited. A security server generates the identifier based on an information set which includes multiple pieces of equipment information of the terminal and serves as the registration information set, and returns the terminal identifier to the terminal. Because the terminal identifier is stored in the terminal, another device may access and acquire the terminal identifier.

Moreover, the security server may return the generated terminal identifier to the terminal at set time slots, in order to reset an expired terminal identifier or replace a lost or compromised terminal identifier. To further ensure the accuracy of the replacement terminal identifier, the security server can acquire the authentication information set again from the terminal, and determine a matching registration information set. The security server then returns to the terminal the terminal identifier corresponding to the matching registration set.

Transferring from an old terminal identifier to a new terminal identifier effectively avoids the situation in which the user behavior associated with the old terminal identifier is lost because the terminal identifier in the terminal is inaccessible. For network risk analysis, transferring to a new terminal identifier effectively avoids the situation in which malicious or illegal behavior of the user cannot be monitored because the user behavior associated with the old terminal identifier is lost, which may lead to potential financial losses. For merchants, the ability to track a user terminal identifier can avoid probable waste of marketing resources due to loss of user behavior data. Reliable identification of user terminals solves the problem of inaccurate merchandise recommendation and invalid risk analysis.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for providing a terminal identifier, comprising:
   receiving, by a security server, a registration information set from a terminal that includes multiple pieces of terminal equipment, wherein the registration information set comprises a first set of equipment-related information associated with the multiple pieces of terminal equipment;
   generating a terminal identifier based on the first set of equipment-related information associated with the multiple pieces of terminal equipment and a key of the security server;
   receiving an authentication information set from the terminal, wherein the authentication information set comprises a second set of equipment-related information associated with the multiple pieces of terminal equipment;
   searching through a plurality of mapping relationships between information sets and terminal identifiers for one or more information sets that have similarity exceeding a predetermined threshold with the authentication information set, wherein a respective mapping relationship maps a respective information set to a terminal identifier;
   selecting, from a plurality of terminal identifiers, a terminal identifier mapped from an information set that has similarity exceeding the predetermined threshold with the authentication information set; and
   returning the selected terminal identifier to the terminal.

2. The method of claim 1, wherein generating the terminal identifier further comprises:

generating a character string based on the first set of equipment-related information associated with the multiple pieces of equipment;

generating a signature based on the character string and the key of the security server;

generating the terminal identifier based on the character string and the signature, and storing data indicating a corresponding mapping relationship between the terminal identifier and the registration information set.

3. The method of claim 1, further comprising:
sending the terminal identifier to the terminal at a plurality of predetermined time slots.

4. The method of claim 1, further comprising:
receiving a second authentication information set from the terminal;

updating the information set using information from the second authentication information set;

receiving a new authentication information set;

searching through the plurality of mapping relationships for the information set that matches the new authentication information set; selecting the terminal identifier mapped from the information set; and returning the terminal identifier to the terminal.

5. The method of claim 1, further comprising:
determining that that the second set of equipment-related information of the authentication information set is different from the first set of equipment-related information of the registration information set;

based on the determination, storing data representing the second set of equipment-related information of the authentication information set; and storing data representing a new mapping relationship between the second set of equipment-related information and the terminal identifier, wherein the terminal identifier is generated based on the first set of equipment-related information of the registration information set.

6. The method of claim 1, wherein searching through the plurality of mapping relationships further comprises using the authentication information set comprising the second set of equipment-related information associated with the multiple pieces of terminal equipment as a search key.

7. A device for providing a terminal identifier, comprising:
one or more processors;
a memory; and
a non-transitory computer-readable medium coupled to the one or more processors storing instructions stored that, when executed by the one or more processors, cause the device to perform a method for providing a terminal identifier, comprising:
receiving, by a security server, a registration information set from a terminal that includes multiple pieces of terminal equipment, wherein the registration information set comprises a first set of equipment-related information associated with the multiple pieces of terminal equipment;

generating a terminal identifier based on the first set of equipment-related information associated with the multiple pieces of terminal equipment and a key of the security server;

receiving an authentication information set from the terminal, wherein the authentication information set comprises a second set of equipment-related information associated with the multiple pieces of terminal equipment;

searching through a plurality of mapping relationships between information sets and terminal identifiers for one or more information sets that have similarity exceeding a predetermined threshold with the authentication information set, wherein a respective mapping relationship maps a respective information set to a terminal identifier;

selecting, from a plurality of terminal identifiers, a terminal identifier mapped from an information set that has similarity exceeding the predetermined threshold with the authentication information set; and returning the selected terminal identifier to the terminal.

8. The device of claim 7, wherein generating the terminal identifier further comprises:
generating a character string based on the first set of equipment-related information associated with the multiple pieces of equipment information in the registration information set;

generating a signature based on the character string and the key of the terminal identifier providing device;

generating the terminal identifier based on the character string and the signature, and storing data indicating a corresponding mapping relationship between the terminal identifier and the registration information set.

9. The device of claim 7, wherein the method further comprises:
sending the terminal identifier to the terminal at a plurality of predetermined time slots.

10. The device of claim 7, wherein the method further comprises:
receiving a second authentication information set from the terminal;

updating the information set using information from the second authentication information set;

receiving a new authentication information set;

searching through the plurality of mapping relationships for the information set that matches the new authentication information set;

selecting the terminal identifier mapped from the information set; and returning the terminal identifier to the terminal.

11. A non-transitory computer-readable storage medium storing instructions that when executed by a computer cause the computer to perform a method for providing a terminal identifier, the method comprising:
receiving, by a security server, a registration information set from a terminal that includes multiple pieces of terminal equipment, wherein the registration information set comprises a first set of equipment-related information associated with the multiple pieces of terminal equipment;

generating a terminal identifier based on the first set of equipment-related information associated with the multiple pieces of terminal equipment and a key of the security server;

receiving an authentication information set from the terminal, wherein the authentication information set comprises a second set of equipment-related information associated with the multiple pieces of terminal equipment;

searching through a plurality of mapping relationships between information sets and terminal identifiers for one or more information sets that have similarity exceeding a predetermined threshold with the authentication information set, wherein a respective mapping relationship maps a respective information set to a terminal identifier;

selecting, from a plurality of terminal identifiers, a terminal identifier mapped from an information set that has similarity exceeding the predetermined threshold with the authentication information set; and returning the selected terminal identifier to the terminal.

12. The storage medium of claim 11, wherein generating the terminal further comprises:

generating a character string based on the first set of equipment-related information associated with the multiple pieces of equipment;

generating a signature based on the character string and key of the security server; and generating the terminal identifier based on the character string and the signature, and storing data indicating a corresponding mapping relationship between the terminal identifier and the registration information set.

13. The storage medium of claim 11, wherein the method further comprises:

sending the terminal identifier to the terminal at a plurality of predetermined time slots.

14. The storage medium of claim 11, wherein the method further comprises:

receiving a second authentication information set from the terminal;

updating the information set using information from the second authentication information set;

receiving a new authentication information set;

searching through the plurality of mapping relationships for the information set that matches the new authentication information set; selecting the terminal identifier mapped from the information set;

and returning the terminal identifier to the terminal.

* * * * *